United States Patent [19]

Fujii

[11] Patent Number: 5,582,071

[45] Date of Patent: Dec. 10, 1996

[54] REVERSE GEAR SQUEAL-PREVENTING DEVICE

[75] Inventor: Isao Fujii, Shizuoka-ken, Japan

[73] Assignee: Suzuki Motor Corporation, Shizuoka-ken, Japan

[21] Appl. No.: 515,980

[22] Filed: Aug. 16, 1995

[30] Foreign Application Priority Data

Aug. 31, 1994 [JP] Japan .................... 6-230327

[51] Int. Cl.$^6$ .................... B60K 41/26; F16H 63/36; F16H 59/02
[52] U.S. Cl. .................... 74/411.5; 74/477; 192/4 C
[58] Field of Search .................... 74/411.5, 477; 192/4 A, 4 C

[56] References Cited

U.S. PATENT DOCUMENTS

| | | | |
|---|---|---|---|
| 4,527,442 | 7/1985 | Hoffmann et al. | 74/411.5 |
| 4,572,020 | 2/1986 | Katayama | 192/4 C X |
| 4,785,681 | 11/1988 | Kuratsu et al. | 192/4 C X |
| 5,119,917 | 6/1992 | Fujii | 192/4 C |
| 5,515,742 | 5/1996 | Ibushuki | 74/411.5 |

OTHER PUBLICATIONS

14 sheets of drawings from U.S. Serial No. 08/301 188, filed on Sep. 6, 1994, now Patent No. 5,515,742 issued May 14, 1996.

*Primary Examiner*—Allan D. Herrmann
*Attorney, Agent, or Firm*—Flynn, Thiel, Boutell & Tanis, P.C.

[57] ABSTRACT

An object of the present invention is to provide a reverse gear squeal-preventing device capable of preventing a reverse gear squeal without increasing an operating force, which device can be realized with fewer components and at lower cost, and further which can be adapted for use in differently structured transmissions. In addition, the device ensures that a forward stage-shifting yoke, which has slightly been moved during reverse gear squeal-preventing operation, can be returned to a neutral position. Further, the device can reduce an impinging noise of a plate-holding bolt at the selecting time, and provides downsizing of the interlocking plate. To this end, the device according to the present invention comprises: a cam member attached to a shifting and selecting shaft so as to be axially movable and circumferential immovable for driving the forward stage-shifting yoke into slight movement in a forward stage-shifting direction at the beginning of the reverse-shifting time; a guide member attached to the cam member so as to be axially movable; a cam spring biased against both of the cam member and a support, the support being fixedly mounted on the shaft; a forward stage-selecting spring biased against both of the cam member and the support via the guide member; and, a restriction portion for limiting movement of the guide member in a forward stage-selecting direction at the time of forward stage selecting.

5 Claims, 10 Drawing Sheets

REVERSE GEAR SQUEAL-PREVENTING DEVICE

FIELD OF THE INVENTION

This invention relates to a reverse gear squeal-preventing device. More particularly, it relates to a reverse gear squeal-preventing device capable of preventing reverse gear squeal without increasing the operating forces of both forward stage selecting and reverse selecting and to a device that has fewer components and a lower cost than conventional devices, and further which is adaptable for use in differently structured transmissions. In addition, the device ensures that a forward stage-shifting yoke, which has slightly been moved in a forward stage-shifting direction during reverse gear squeal-preventing operation, is returned to a neutral position. Further, the device reduces impact noise of a plate-holding bolt at the selecting time, and further to realize a compact size of an interlocking plate.

BACKGROUND OF THE INVENTION

In vehicles, either a manually or an automatically operated transmission is provided for varying the power of an internal combustion engine to a required level in accordance with traveling conditions before the power is taken off from the transmission. One such type of manual transmission is disclosed in U.S. Patent No. 5,119,917, which is incorporated herein by reference. This type of transmission may be classed as a gear type transmission, a belt type transmission, and the like, among which the gear type transmission is in widespread use because of a reduced loss of power transmission.

The gear type of the manually operated transmission includes a speed change gear train having multiple stages. The gear train is shifted using a shift lever so as to provide gear engagement at different stages. The power of the internal combustion engine is thereby varied to a required point in accordance with traveling conditions. Then, the varied power is taken off from the transmission.

The aforesaid gear type of the manually operated transmission may be classified as, e.g., a selective sliding gear type, a constant mesh type, and the like, depending on how a speed change ratio is varied.

The selective sliding gear type of the manually operated transmission has respective gears mounted on a main shaft, a counter shaft, and a reverse idler shaft. The main shaft is an input shaft which is connected to and disconnected from the internal combustion engine by means of a clutch on the engine side. The counter shaft and the reverse idler shaft extend substantially parallel to the main shaft. A reverse idler gear, which is mounted on the reverse idler shaft, is slidingly driven into engagement with both a reverse main gear and a sleeve gear which are positioned respectively on the main shaft and the counter shaft, thereby transmitting the power thereto from the engine. In addition, this type of transmission is constructed to allow the reverse idler gear to be operational, even when a vehicle remains stationary.

In the constant mesh type of the manually operated transmission, pairs of gears corresponding in number to necessary speed change stages are constantly engaged with each other. Further, the transmission is designed to permit an idle operation between the shafts and the gears. In order to achieve torque transfer, the pairs of gears providing the required speed change ratios are fixed to the shafts by means of coupling sleeves that are mounted on the shafts.

SUMMARY OF THE INVENTION

The selective sliding gear type of the manually operated transmission provides selective sliding engagement because the reverse gears are usually engaged and controlled in a stopped state of vehicle. At the same time, when the reverse gears are driven into engagement, the sleeve gear on the counter shaft, which is at rest, and the main reverse gear on the main shaft, which continues rotating as a result of inertia after the clutch is released, are engaged with one another via the revere idler gear which is slid on the reverse idler shaft. This causes shortcomings of: the occurrence of a gear squeal and a concomitant feeling of uncomfortableness; and, possible damage to portions of the gears and a consequential reduction in gear life.

In order to overcome the above imperfections, it is necessary to provide a synchronizing mechanism as a constant mesh type similar to the other gears. This countermeasure, however, has inconveniences of increased weight, a complicated structure, and high cost, all of which are disadvantageous from practical and economical viewpoints.

For this reason, a simpler synchronizing mechanism has come into service, which functions only to stop the main shaft from rotating before the reverse idler gear is engaged with the sleeve gear.

As one example of such a construction, there is a reverse gear squeal-preventing device in which the forward stage-synchronizing mechanism, e.g., the second speed-synchronizing mechanism, is lightly actuated to slow or stop the rotation of the main shaft at the time of, e.g., reverse-shifting operation, which is the time to change a rotational speed to a reverse stage.

In this case, it is necessary to bring the second speed-synchronizing mechanism into temporary operation, and further to release the same synchronizing mechanism before engagement of second speed gears occurs. To this end, a method in customary use is that the resilient force of a spring is used to run the second speed-synchronizing mechanism, and further that the spring is forced against a stopper before engagement of the gears so as to be compressed, thereby releasing the synchronizing mechanism.

As the reverse gear squeal-preventing device, there is another one which has already been published, and which was filed by the same applicant of the present invention, Japanese Patent Application Laid-Open No. 3-121373/U.S. patent application Ser. No. 08/301 188 which are incorporated herein by reference. The device according to this application is provided with a cam mechanism which includes first and second cams. The first cam is mounted on a shifting and selecting shaft. The second cam is positioned on a first/second speed-shifting shaft. A first/second speed-synchronizing mechanism is actuated at the time of reverse shifting by way of engagement and disengagement of the first and second cams. The main shaft is thereby stopped from rotating, with the result that the reverse gears are prevented from squealing.

However, the above-described device has the inconvenience of high cost due both to a complicated structure and its numerous components. There is another inconvenience in that return to a neutral position is required for actuating the synchronizing mechanism because a reverse gear squeal is prevented by the engagement and disengagement of the first and second cams of the cam mechanism.

Figure 17:
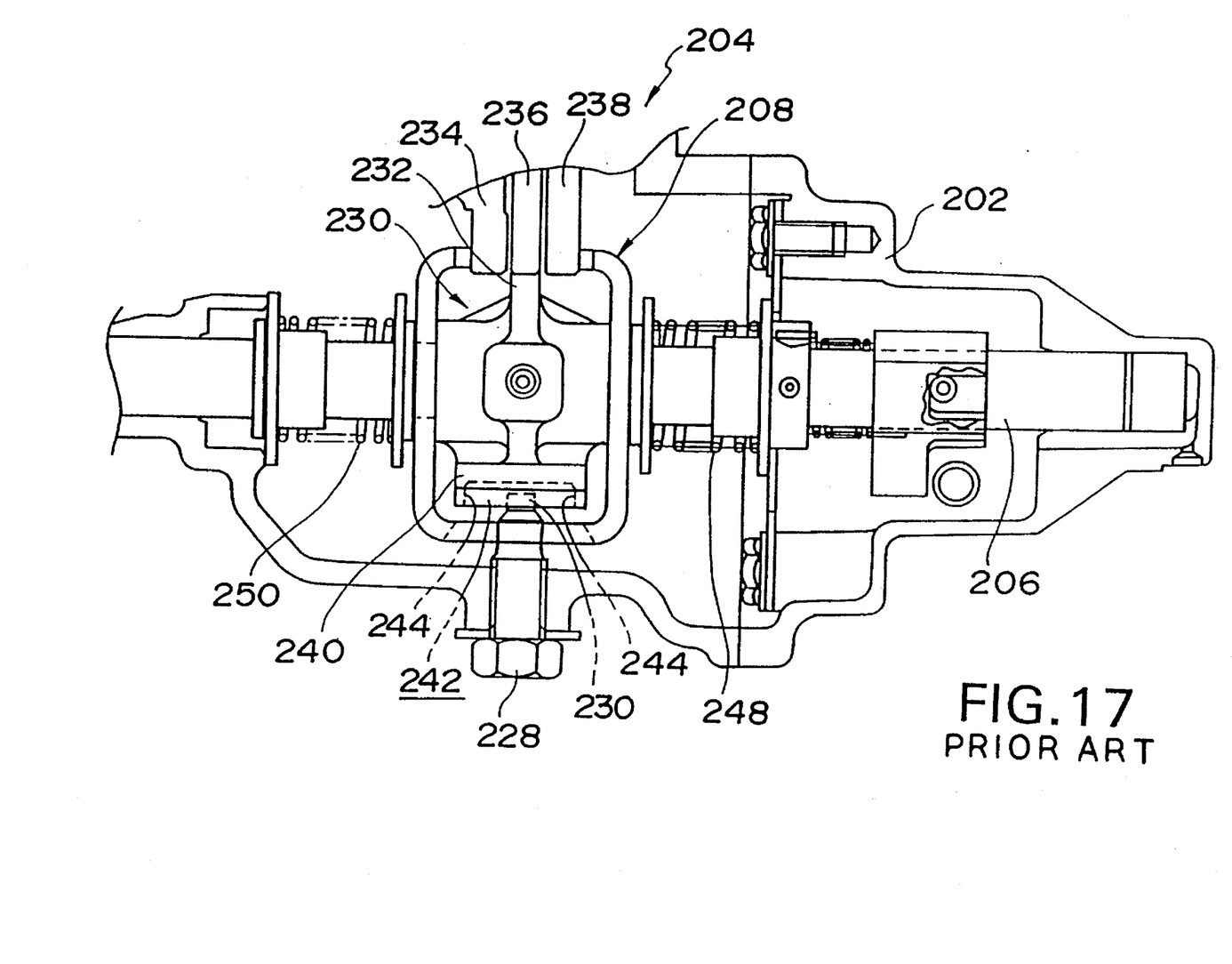
FIG. 17 is a structural view, showing a conventional example of a speed change control section at the time of a neutral mode.

FIGS. 17≧20 illustrate a speed change control section of an ordinary transmission of a reverse selective sliding gear type without the reverse gear squeal-preventing device. In FIG. 17, reference numerals 202 and 204 denote a transmission case and the speed change control section, respectively. The control section 204 has a shifting and selecting shaft 206 positioned in the transmission case 210. The shaft 206 is driven into both axial movement at the selecting time and circumferential movement about the axis of the shaft 206 at the shifting time, depending upon a handled state of a shift lever (not shown).

Figure 18:
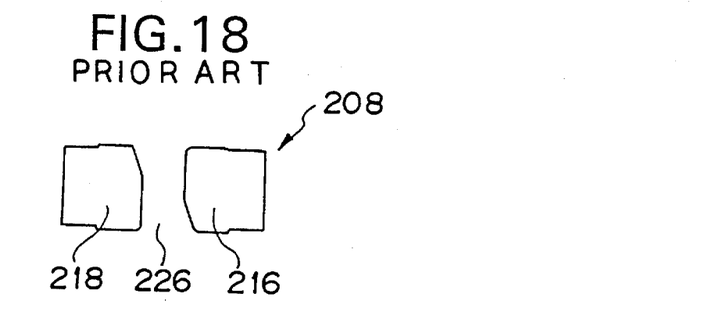
FIG. 18 is a plan view, showing a conventional interlocking plate.
Figure 19:
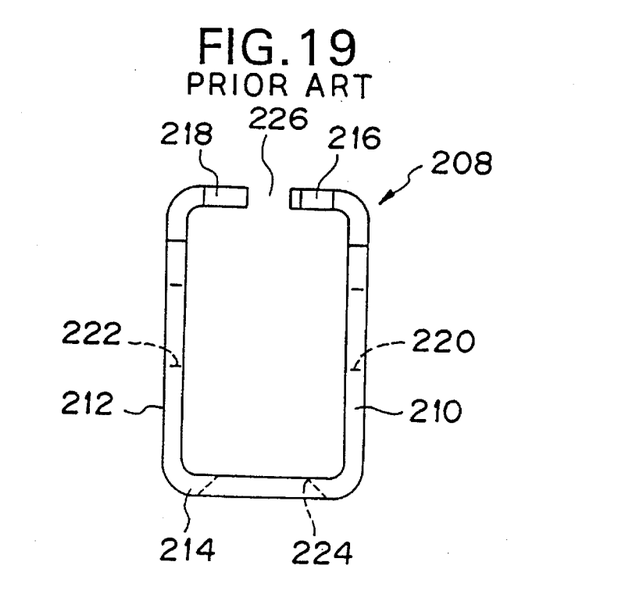
FIG. 19 is a front view, showing the conventional interlocking plate.

The shaft 206 is provided with an interlocking plate 208 as a prevention against malfunction. As illustrated in FIGS. 18 and 19, the interlocking plate 208 consists of: first and second slide portions 210 and 212 extending parallel to one another; an interconnecting portion 214 interconnecting ones of respective end portions of the side portions 210 and 212; and, first and second guide portions 216 and 218 formed by the other ones of the respective end portions of the side portions 210 and 212 being folded so as to oppose one another. The interlocking plate 208 is thereby formed into a substantially U-shaped configuration.

The side portions 210 and 212 are formed with first and second shaft holes 220 and 222, through which the shifting and selecting shaft 206 is inserted. The interconnecting portion 214 is defined with a bolt insertion hole 224. There is a lever groove 226 formed between the first and second guide portions 216 and 218.

The interlocking plate 208 has the shaft 206 inserted through the shaft holes 220 and 222. A distal end portion 230 of a plate-holding bolt 228 is driven through the bolt insertion hole 224. The bolt 228 is mounted on the transmission case 202. The interlocking plate 208 is thereby supported so as to be movable in the axial direction of the shaft 206.

A shifting and selecting lever 230 is mounted on the shaft 206 inside the interlocking plate 208. A lever member 232 is positioned on one side of both ends of the lever 230. The lever member 232 is brought into selective engagement with a first/second speed-shifting yoke 234, a third/fourth speed-shifting yoke 236, and a fifth speed/reverse-shifting yoke 238.

The shifting yokes 234 and 236 are positioned respectively on a first/second speed-shifting shaft (not shown) and a third/fourth speed-shifting shaft (not shown). The shifting yoke 238 is mounted on a fifth speed/reverse-shifting shaft (not shown), and is further guided by a fifth speed/reverse-guiding shaft (not shown).

Figure 20:
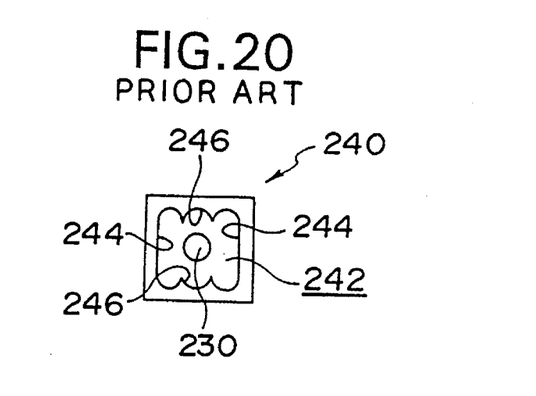
FIG. 20 is a bottom view, illustrating a conventional stopper member.

A stopper member 240 is located on the other side of both ends of the lever 230. Referring to FIG. 20, the stopper member 240 is shown provided with a stopper recess 242 in which the distal end portion 230 of the plate-holding bolt 228 is loosely inserted. There are selecting stroke stopper portions 244 and shifting stroke stopper portions 246 located in the stopper recess 242.

The distal end portion 230 of the bolt 228 is driven against the above-stopper portions 244 and 246 in the stopper recess 242, and the lever 230 is thereby subjected to restrictions on both a selecting stroke and a shifting stroke. Reference numerals 248 and 258 denote return springs.

However, the arrangement in which the stopper member 240 is located on one side of both ends of the lever 230 increases the size of the interlocking plate 208. This is an inconvenience of the speed change control section 204. There is another inconvenience in that an impinging noise is loudly emitted at the selecting time because the selecting and shifting strokes are limited by the distal end portion 230 of the bolt 228 being driven against the stopper portions 244 and 246 in the stopper member 240.

Some of the conventional reverse gear squeal-preventing devices provide reverse gear squeal-preventing action in accordance with a relative angle between the interlocking plate and the cam, which are mounted on the shifting and selecting shaft.

However, this type of the device has a problem of providing the reverse gear squeal-preventing action, even at the time of second speed shifting and fourth speed shifting as well as the time of reverse shifting, irrespective of an axial position, or rather a selecting position of the shifting and selecting shaft. As a result, there is an inconvenience in that the resilient force of a cam spring, which biases and urges a cam toward the interlocking plate, is added at the time of second speed shifting and fourth speed shifting, thereby increasing an operating force. Another problem is that the accuracy of mounting the interlocking plate with respect to the shifting and selecting shaft is easily affected. This problem causes an inconvenience in that the accuracy of the reverse gear squeal-preventing action is difficult to ensure.

Further, the above-mentioned device actuates the cam at the time of reverse shifting by driving the cam in a direction in which the cam spring is further compressed, which cam is biased and urged by the cam spring toward the interlocking plate. As a result, the device has another inconvenience in that the operating force for reverse shifting is increased.

In order to obviate the above-described inconveniences, the present invention provides a reverse gear squeal-preventing device that includes a shifting and selecting shaft adapted to provide both axial movement at selecting time and circumferential movement at shifting time, depending on how the shift lever is controlled. The shifting and selecting shaft is provided with an interlocking plate as a prevention against malfunction, whereby a forward stage-synchronizing mechanism is actuated at the time of reverse shifting so as to prevent a gear squeal. The improvement of this invention comprises: a cam member attached to the shifting and selecting shaft so as to be axially movable and circumferential immovable for driving a forward stage-shifting yoke into slight movement in the forward stage-shifting direction at the beginning of reverse-shifting time; a guide member attached to the cam member so as to be axially movable; a cam spring biased at one end against the cam member and at the other end against a support that is fixedly positioned on the shifting and selecting shaft; a forward stage-selecting spring biased at one end against the cam member and the other end against the support via the guide member; and, a restriction portion located in the transmission case for restricting movement of the guide member in a forward stage-selecting direction so as to compress the selecting spring at the time of forward stage selecting.

According to the present invention having the above structure, the reverse gear squeal-preventing device includes the cam member which is fitted to the shifting and selecting shaft so as to allow axial movement, but prevent circumferential movement. The cam member drives the forward stage-shifting yoke into a small movement in the forward stage-shifting direction at the beginning of the reverse-shifting time.. The cam member thereby allows the forward stage-synchronizing mechanism to be brought into slight action at the beginning of the reverse-shifting process, with the result that the synchronous action of the synchronizing mechanism stops rotation of a main shaft. As a result, the device prevents the reverse gears from squealing.

The device further includes: the guide member attached to the cam member so as to be axially movable; the cam spring biased at one end against the cam member and at the other end against the support that is fixedly positioned on the shaft; the forward stage-selecting spring biased at one end against the cam member and the other end against the support via the guide member; and, the restriction portion positioned in the transmission case for restricting movement of the guide member in the forward stage-selecting direction so as to compress the selecting spring at the time of forward stage selecting. This structure can reduce stresses which are exerted on the selecting spring at the time of reverse selecting, and eliminates the stresses which would otherwise be imposed on the cam spring at the time of forward stage selecting.

DETAILED DESCRIPTION

An embodiment of the present invention will now be described with reference to the drawings.

Figure 1:
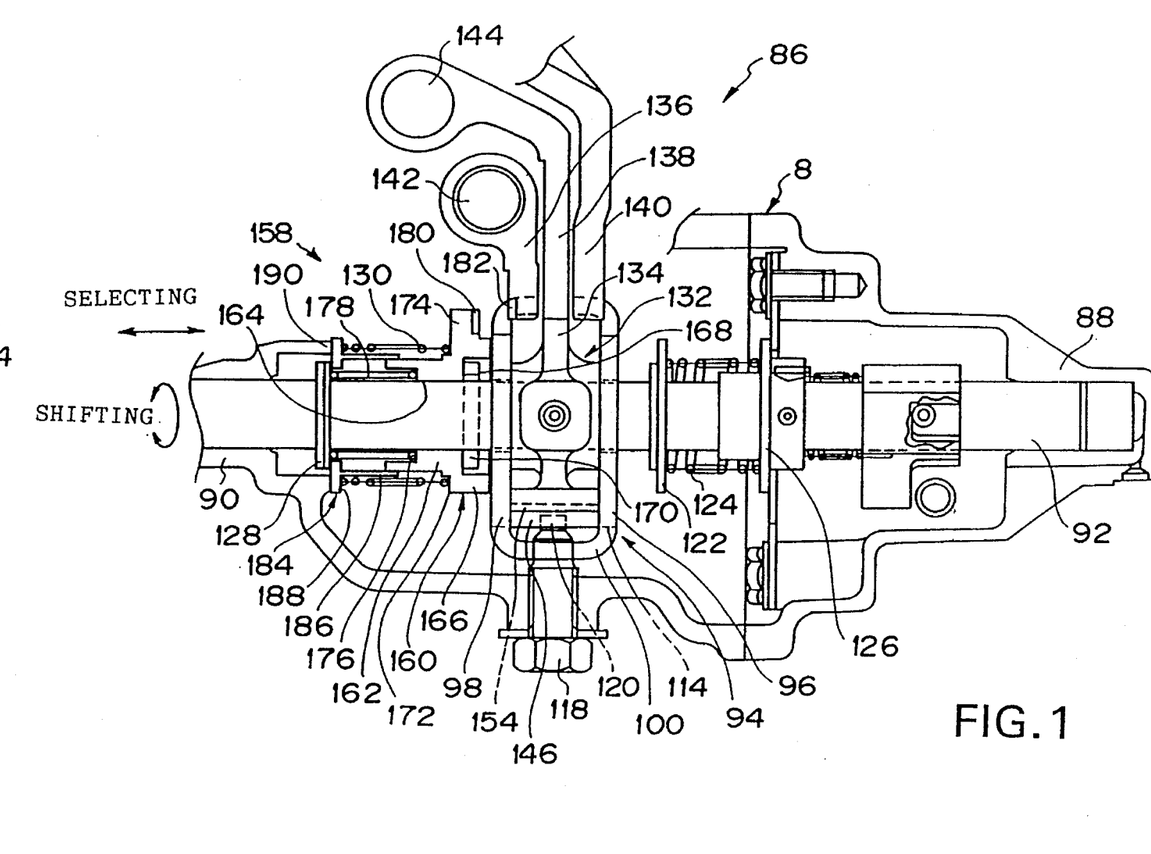
FIG. 1 is a structural view, illustrating a speed change control section as an embodiment of a reverse gear squeal-preventing device according to the present invention.
Figure 6:
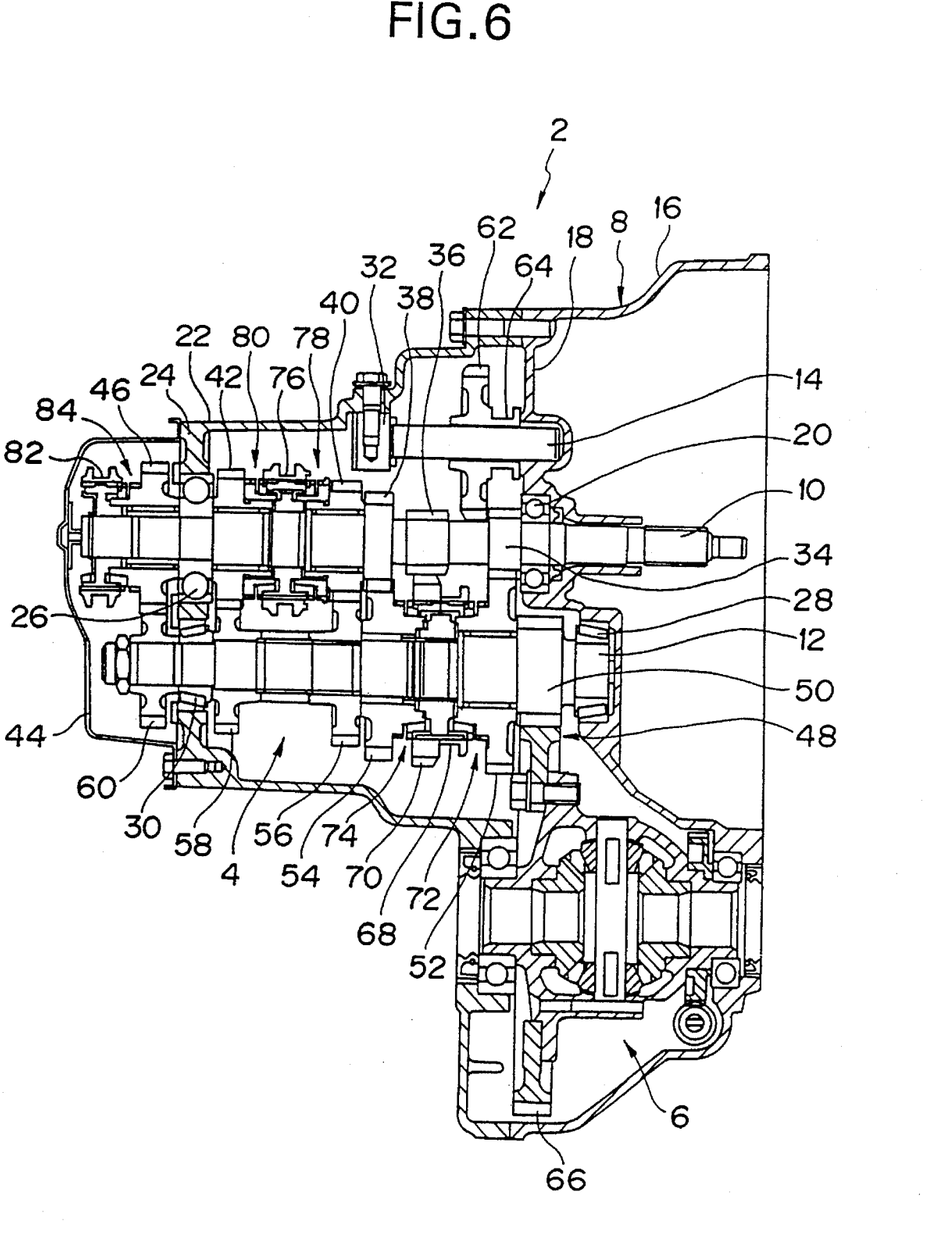
FIG. 6 is a structural view, illustrating a transmission.

FIGS. 1≧18 illustrate the present embodiment of the invention. In FIG. 6, reference numeral 2 denotes a selective sliding gear type of a manually operated transmission (hereinafter simply called a "transmission"); reference numeral 4 a gear section; reference number 6 a differential section; reference number 8 a transmission case. The transmission case 8 houses a main shaft 10, a counter shaft 12, and a reverse idler shaft 14. The main shaft 10 is an input shaft, to and from which driving power from an internal combustion engine (not shown) is respectively connected and disconnected by means of a clutch (not shown). These shafts are arranged in a longitudinal direction of the transmission 2, while extending substantially parallel to each other.

The main shaft 10 is rotatably supported by first and second main shaft bearings 20 and 26. The first bearing 20 is retained in a right case 16 of the transmission case 8 in a right wall portion 18 thereof. The second bearing 26 is held in a left case 22 of the transmission case 8 in a left wall portion 24 thereof.

The counter shaft 12 is rotatably supported by first and second counter shaft bearings 28 and 30. The first bearing 28 is held at the preceding right wall portion 18, while the second bearing 30 is retained at the aforesaid left wall portion 24.

The reverse idler shaft 14 is rotatably supported by the right wall portion 18 and a support portion 32. The support portion 32 is fixedly mounted on the left case 24.

The main shaft 10 has the following gears fixedly mounted thereon in turn from the internal combustion engine side: a first speed main gear 34; a reverse main gear 36; and, a second speed main gear 38. Further, the following gears are rotatably positioned in sequence on the main shaft 10; a third speed main gear 40; a fourth speed main gear 42; and, a fifth speed main gear 46 within a side case 44 of the transmission case 10.

The counter shaft 12 is provided with the following gears in turn from the engine side: a final-driving gear 50 which constitutes a final speed reduction mechanism 48; a first speed counter gear 52 which is engaged with the first speed main gear 34; and, a second speed counter gear 54 which is engaged with the second speed main gear 38. The final-driving gear 48 is fixed to the counter shaft 12, while the first and second speed counter gears 52 and 54 are rotatably positioned thereon. In addition, the following gears are fixedly mounted in sequence on the counter shaft 12: a third speed counter gear 56 which is engaged with the third speed main gear 40; a fourth speed counter gear 58 which is engaged with the fourth speed main gear 42; and, a fifth speed counter gear 60 which is engaged with the fifth speed main gear 46 within the side case 44.

The reverse idler shaft 14 has a reverse idler gear 62 rotatably positioned thereon. The reverse idler gear 62 is provided integrally with a reverse sleeve 64. The reverse idler gear 62 is provided so as to be engageable with the reverse main gear 36 and a sleeve gear 70, the latter being described hereinbelow.

The final-driving gear 50 is engaged with a final-driven gear 66 which is provided in the differential section 6.

The counter shaft 12 has a first/second speed sleeve 68 mounted thereon between the first and second speed counter gears 52 and 54. The sleeve 68 is provided integrally with the preceding sleeve gear 70 which is a reverse counter gear.

The sleeve gear 70 is provided so as to be engageable with the reverse idler gear 62.

The counter shaft 12 has a first speed-synchronizing mechanism 72 positioned thereon between the first/second speed sleeve 68 and the first speed counter gear 52. Further, a second speed-synchronizing mechanism 74 is mounted on the counter shaft 12 between the sleeve gear 70 and the second speed counter gear 54.

The main shaft 10 has a third/fourth speed sleeve 76 mounted thereon between the third speed main gear 40 and the fourth speed main gear 42.

The main shaft 10 has a third speed-synchronizing mechanism 78 positioned thereon between the third/fourth speed sleeve 76 and the third speed main gear 40. Further, a fourth speed-synchronizing mechanism 80 is mounted on the main shaft 10 between the third/fourth speed sleeve 76 and the fourth speed main gear 42.

The main shaft 10 has a fifth speed sleeve 82 positioned thereon adjacent to the fifth speed main gear 46. Further, a fifth speed-synchronizing mechanism 84 is mounted on the main shaft 10 between the fifth speed sleeve 82 and the fifth speed main gear 46.

The transmission 2 is designed to change a state of engagement in the gear section 4 by means of a speed change control section 86. As illustrated in FIG. 1, the control section 86 has a shifting and electing shaft 92 retained at shaft-holding portions 88 and 90 of the transmission case 8. The shaft 92 is driven into both axial movement at the selecting time and circumferential movement about the axis of the shaft 92 at the shifting time, depending upon a handled state of a shift lever (not shown). The shaft 92 provides such movements via a control shaft (not shown) and the like.

Figure 3:
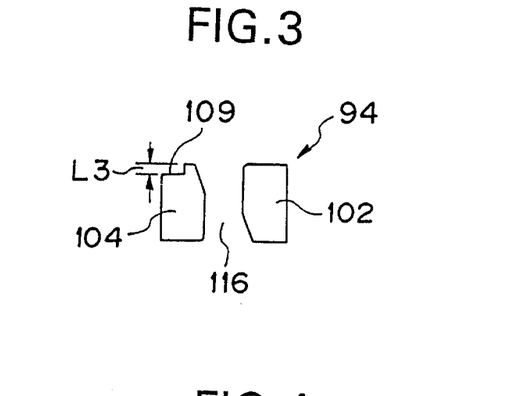
FIG. 3 is a plan view, showing an interlocking plate.
Figure 4:
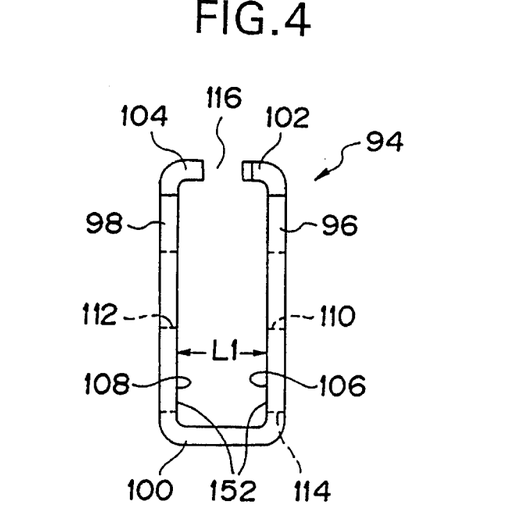
FIG. 4 is a front view, showing the interlocking plate.

The shifting and selecting shaft 92 is provided with an interlocking plate 94 as a prevention against malfunction. Referring now to FIGS. 3 and 4, the interlocking plate 94 consists of: first and second side portions 96 and 98 which extend parallel to one another; and interconnecting portion 100 for connecting ones of respective end portions of the above side portions 96 and 98 together; and, first and second guide portions 102 and 104 which are formed by the other ones of the respective end portions of the side portions 96 and 98 being folded so as to oppose one another. The interlocking plate 94 is thereby formed into a substantially U-shaped configuration.

The interlocking plate 94 is configured to have a selecting stroke length of L1 in an axial direction of the shaft 92 as a length between first and second inner surfaces 106 and 108 of the side portions 96 and 98. In addition, the interlocking plate 94 is provided with a step portion 109 at the first guide portion 104. The step portion 109 has a length of L3. The step portion 109 allows a first/second-shifting yoke 136 to be driven into a small movement at the beginning of reverse shifting.

The side portions 96 and 98 are formed with first and second shaft holes 110 and 112, through which the shaft 92 is inserted. The interconnecting portion 100 is formed with a bolt insertion hole 114. A lever groove 116 is formed between the guide portions 102 and 104.

The shaft 92 is inserted through the shaft holes 110 and 112. A distal end portion 120 of a plate-holding bolt 118, which is mounted on the transmission case 8, is inserted through the bolt insertion hole 114. The interlocking plate 94 is thereby supported so as to be movable in an axial direction of the shaft 92.

A spring support 122 is located on one side of axial ends (the right side of FIG. 1) of the shaft 92 which is fitted with the interlocking plate 94. The spring support 122 is spaced apart from the interlocking plate 94. In addition, one end of a return spring 124 is biased against the spring support 122. The return spring 124 is a positioning spring which is slackly looped around with the shaft 92. The other end of the return spring 124 is biased against a case side support 126. The shaft 92, which has been brought into fifth speed/reverse-selecting action, is thereby pushed to a neutral position.

Another spring support 128 is positioned on the other side of the axial ends (the left side of FIG. 1) of the shaft 92 which is fitted with the interlocking plate 94. One end of a first/second speed-selecting spring 130 is biased against the spring support 128 via a guide member 184 that will be described hereinbelow. The spring 130 is a return spring which is loosely wound around the shaft 86. The other end of the spring 130 is biased against the interlocking plate 94 via a cam member 160. The shaft 92, which has been brought into first/second speed-selecting action, is thereby pushed to the neutral position. The cam member 160 will be described hereinbelow.

The shaft 92 has a shifting and selecting lever 132 mounted thereon within the interlocking plate 94. A lever member 134 is positioned on one side of both ends of the lever 132. The lever member 134 is brought into selective engagement with: the first/second speed-shifting yoke 136; a third/fourth speed-shifting yoke 138; and, a fifth speed/reverse-shifting yoke 140.

The shifting yoke 136 is mounted on a first/second speed-shifting shaft 142. The shifting yoke 138 is mounted on a third/fourth speed-shifting shaft 144. The shifting yoke 140 is positioned on a fifth speed/reverse-shifting shaft (not shown), and is further guided by a fifth speed/reverse-guiding shaft (not shown).

The shifting shaft 142 is provided with a first/second speed fork (not shown) which actuates the previously mentioned first/second speed sleeve 68. The first/second speed fork is engaged with the first/second speed sleeve 68. The shifting shaft 144 is provided with a third/fourth speed fork (not shown) which actuates the previously mentioned third/fourth speed sleeve 76. The third/fourth speed fork is engaged with the third/fourth speed sleeve 76.

The unillustrated fifth speed/reverse-shifting shaft is provided with a fifth speed fork (not shown) which actuates the fifth speed sleeve 82. The fifth speed fork is engaged with the fifth speed sleeve 82. In addition, the fifth speed/reverse-shifting shaft is provided with a member for actuating the previously mentioned reverse sleeve 64, e.g., a reverse gear-shifting arm for swinging a reverse gear-shifting lever which is engaged with the reverse sleeve 64.

Figure 5:
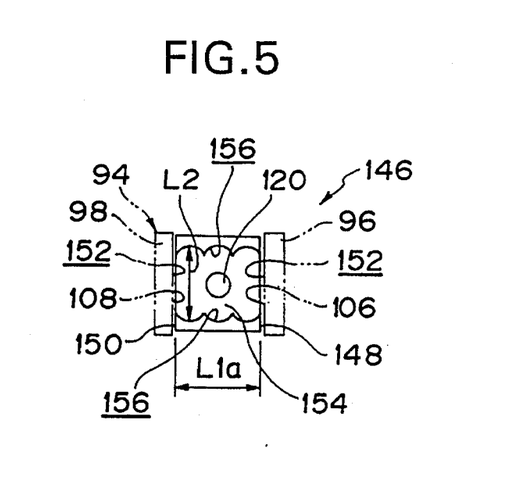
FIG. 5 is a bottom view, showing a stopper member.

A stopper member 146 is located on the other side of both ends of the lever 132. As illustrated in FIG. 5, the stopper member 146 is configured to have a length of L1a in the axial direction of the shaft 92. The length of L1a is slightly less than the selecting stroke length of L1.

First and second edge surfaces 148 and 150 of the stopper member 146 in the axial direction of the shaft 92 are positioned both in close proximity to and in an opposed relationship to the first and second inner surfaces 106 and 108 of the side portions 96 and 98 of the interlocking plate 94. In this state, the stopper member 146 is positioned between the first and second side portions 96 and 98 of the interlocking plate 94. As a result, the above inner surfaces 106 and 108 provide selecting stroke stopper portions 152.

The stopper member 146 is provided with a stopper groove portion 154 in which the distal end portion 120 of the plate-holding bolt 118 is loosely inserted. The stopper groove portion 154 is formed so as to terminate at the aforesaid first and second edge surfaces 148 and 150. In addition, there are provided shifting stroke stopper portions 156 within the stopper groove portion 154. The stopper portions 156 have a shifting stroke length of L2 therebetween in a circumferential direction of the shaft 92. The stopper portions 156 are respectively located (six locations) for each direction in which shifting is made to one of first-to-fifth speed and reverse.

As a result, the shifting and selecting lever 132 is subjected to restriction on a selecting stroke because the distal end portion 120 of the bolt 118 is driven against the selecting stroke stopper portions 152 which are the inner surfaces 106 and 108 of the interlocking plate 94. Further, the lever 132 is subjected to restriction on a shifting stroke because the aforesaid distal end portion 120 is forced into contact with the shifting stroke stopper portions 156 within the stopper groove portion 154 of the stopper member 146.

The transmission 2 is provided with a reverse gear squeal-preventing device 158. The device 158 has the cam member 160 located on one side of the axial ends (the left side of FIG. 1) of the shaft 92 which is fitted with the interlocking plate 94. The cam member 160 is attached to the shaft 92 so as to allow axial movement, but to preclude circumferential movement. The cam member 160 forces the first/second speed-shifting yoke 136 into small movement in a first speed-shifting direction at the beginning of the time when the shaft 92 undergoes reverse shifting.

Figure 2:
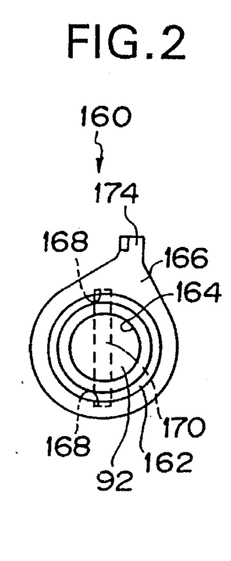
FIG. 2 is a side view, showing a cam member in a state of being attached to a shifting and selecting shaft.

As illustrated in FIGS. 1 and 2, the cam member 160 includes a cylindrical portion 162, and the cylindrical portion 162 is provided with a hole portion 164 therein, through which the shaft 92 is inserted. In addition, the cam member 160 is provided with a protruding edge portion 166 in the shape of an annular plate, which is positioned on one side of axial ends of the cylindrical portion 162. Radially extending groove portions 168 are provided in the protruding edge portion 166. A guide pin 170 extends radially through the shaft 92 so as to be fixedly secured to the shaft 92. The groove portions 168 are thereby engaged by ends of the guide pin 170. As a result, the cam member 160 is attached to the shaft 92 so as to be axially movable but circumferentially immovable.

The cam member 160 is further provided with: an outer peripheral support portion 172 which is located on the side of the protruding edge portion 166 on the cylindrical portion 162; an engaging portion 174 which projects from the protruding edge portion 166; and, an inner peripheral support portion 176 which is positioned on the opposite side of the cylindrical portion 162. The outer peripheral support portion 172 extends in a circumferentially outward direction of the cylindrical portion 162. The engaging portion 174 is oriented in a direction of a forward stage-shifting yoke, i.e., the first/second speed-shifting yoke 136. The inner peripheral support portion 176 extends in a circumferentially inward direction of the cylindrical portion 162.

In addition, the cam member 160 is provided with a cam spring 178 whose one end is biased against the inner peripheral support portion 176. The other end of the cam spring 178 is biased against the spring support 128 that is fixedly positioned on the shaft 92. The cam spring 178 pushes the cam member 160 toward the interlocking plate 94.

Figure 8:
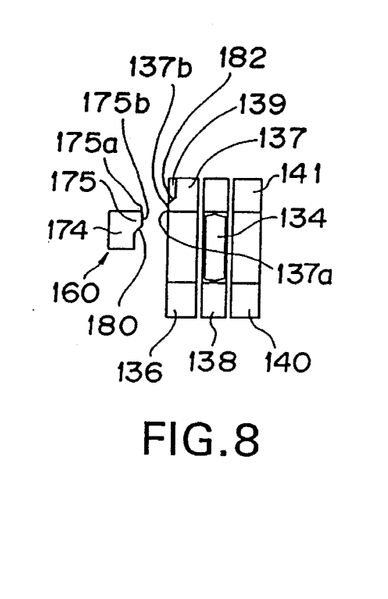
FIG. 8 is a structural view, showing shifting yokes and a cam member at the time of the neutral mode.
Figure 9:
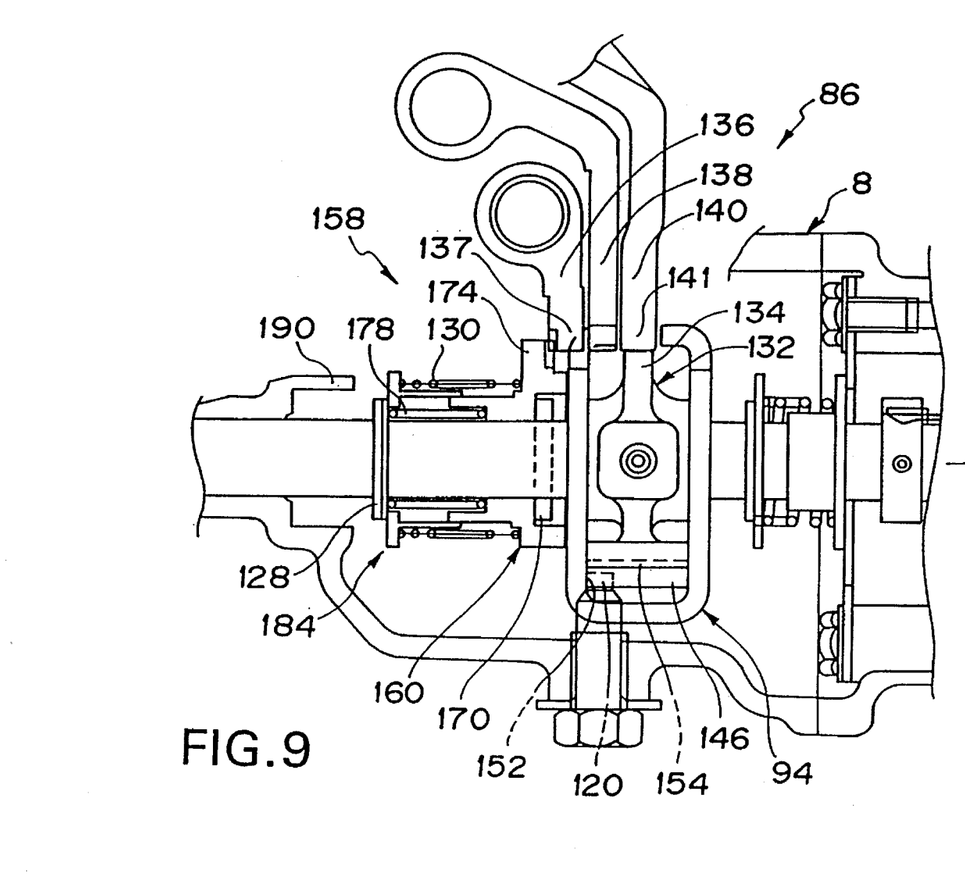
FIG. 9 is a structural view, illustrating the speed change control section at the time of reverse selecting.
Figure 10:
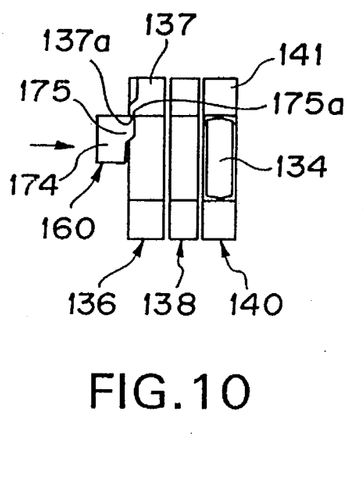
FIG. 10 is a structural view, showing the shifting yokes and the cam member at the time of reverse selecting.

Referring now to FIGS. 8≧10, the cam spring 178 advances the engaging portion 174 into engagement with the first/second speed-shifting yoke 136 at the time of reverse selection. The engaging portion 174 is released from the engagement with the shifting yoke 136 against the force of the cam spring 178 after the shifting yoke 136 slightly moves in the second speed-shifting direction at the beginning of the reverse-shifting time.

The engaging portion 174 is provided with: a protruding portion 175; a slanted abutment surface 175a which is urged against an inwardly slanted abutment surface 137a of a second speed yoke portion 137 of the first/second speed-shifting yoke 136; a side surface 175b which is forced against a side surface 137b of the second speed yoke portion 137; and, a slanted pressing surface 180. In the shifting yoke 136 to be brought into and out of engagement with the engaging portion 174, the second speed yoke portion 137 is provided with: the abutment surface 137a, against which the abutment surface 175a is driven; the side surface 137b, against which the side surface 175b is forced; a dented portion 139 which is engaged with the protruding portion 175; and, a slanted pressed surface 182 which is pressed by the pressing surface 180.

The cam spring 178 urges the pressing surface 180 to press the pressed surface 182 at the end of the reverse-shifting time. The first/second speed-shifting yoke 136, which has slightly been moved in the second speed-shifting direction, is thereby moved to the neutral position.

The cam member 160 is provided with the guide member 184 which is attached thereto in an axially movable manner. The guide member 184 is provided with a cylindrical-shaped fit portion 186 which fits to the cylindrical portion 162 in an axially movable manner. The fit portion 186 is provided with an annular plate-shaped abutment portion 188 which projects in radially outward and inward directions thereof. The abutment portion 188 is positioned on one side of both ends of the fit portion 186 (the left side of FIG. 1), which is spaced apart from the cam member 160.

The spring support 128 abuts part of the abutment portion 188 which extends circumferentially inward from the fit portion 186. The first/second speed-selecting spring 130 is biased at one end against part of the abutment portion 188 which extends circumferentially outward from the fit portion 186. The other end of the selecting spring 130 is biased against the outer peripheral support portion 172 of the cam member 160.

The transmission case 8 has a restriction portion 190 provided at the shaft-holding portion 90. The abutment portion 188 of the guide member 184 is brought into and out of contact with the restriction portion 190. The restriction portion 190 allows movement of the spring support 128 in the first/second speed-selecting direction in order to avoid compressing the cam spring 178 at the time of first/second speed selecting. In order to compress only the selecting spring 130 at the time of first/second speed selecting, the abutment portion 188 is driven against the restriction portion 190, thereby restricting the movement of the guide member 184 in the first/second speed-selecting direction.

In conclusion, the reverse gear squeal-preventing device 158 is provided with: the cam member 160 attached to the shaft 92 so as to be axially movable and circumferential immovable for driving the first/second speed-shifting yoke 136 into slight movement in the second speed-shifting direction at the beginning of reverse-shifting time; the guide member 184 attached to the cam member 160 so as to be axially movable; the cam spring 178 biased at one end against the cam member 160 and at the other end against the spring support 128 that is fixedly mounted on the shaft 92; the first/second speed-selecting spring 130 biased at one end against the cam member 160 and the other end against the spring support 128 via the guide member 184; and, the restriction portion 190 located in the transmission case 8 for restricting movement of the guide member 160 in the first/second speed-selecting direction so as to compress the selecting spring 130 at the time of first/second speed selecting.

In addition, the cam member 160 is provided with the engaging portion 174 which is advanced by the cam spring 178 into engagement with the first/second speed-shifting yoke 136 at the time of reverse selecting. The engaging portion 174 is released from the engagement with the shifting yoke 136 against the force of the cam spring 178 after the shifting yoke 136 is slightly moved toward the second speed-shifting direction at the beginning of the reverse-shifting time. Further, the shifting yoke 136 is defined with the pressed surface 182, while the cam member 160 is provided with the pressing surface 180 for pushing the pressed surface 182 with the aid of the cam spring 178 at an intermediate period of reverse-shifting time. The shifting yoke 136, which has slightly been moved in the second speed-shifting direction, is thereby moved to the neutral position.

The device 158 thereby prevents a squeal of the reverse gears.

Next, the operation of the present embodiment will be described.

In the transmission 2, the main shaft 10 continues rotating as a result of driving power from an internal combustion engine when a vehicle is stopped with a speed change control section 86 being in a neutral state. However, a counter shaft 12 is stopped from rotating because the vehicle is at rest.

Figure 7:
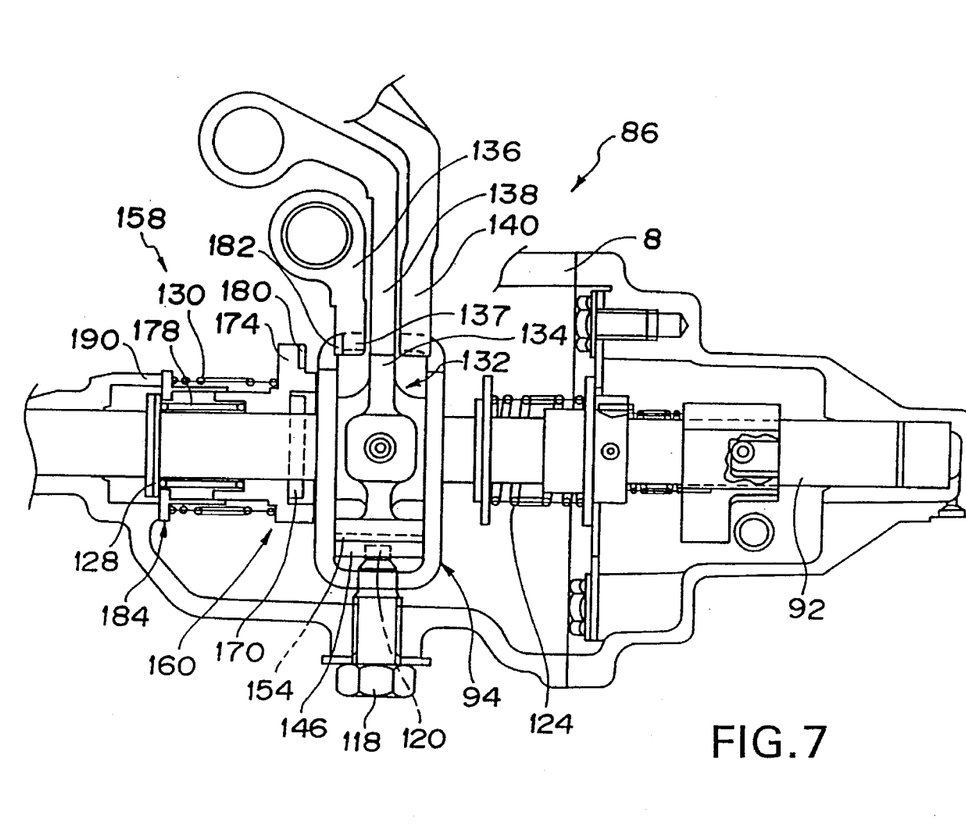
FIG. 7 is a structural view, depicting the speed change control section at the time of a neutral mode.

Referring to FIGS. 9 and 10, the shifting and selecting shaft 92 is shown moved in an axial direction indicated by an arrow together with both the interlocking plate 94 and the shifting and selecting lever 132 when the control section 86 executes operation to change from a neutral position, as shown in FIGS. 7 and 8, to a reverse-selecting position. Further, the cam member 160, which is pushed toward the interlocking plate 94 by both the first/second speed-selecting spring 130 and the cam spring 178, is moved jointly with the cam guide 184.

As shown in FIGS. 9 and 10, the lever 132 in the interlocking plate 94 is brought into engagement with a fifth speed/reverse-shifting yoke 140 as a result of its movement to the reverse-selecting position. In addition, the distal end portion 120 of a plate-holding bolt 118 is driven against the selecting stroke stopper portion 152, or rather the inner surface 108 of the interlocking plate 94, thereby restricting the selecting stroke. Further, the movement to the reverse-selecting position causes the cam member 160 to be moved to a position at which both of the selecting spring 130 and the cam spring 178 drive the abutment surface 175a of a protruding portion 175 of an engaging portion 174 into engagement with an abutment surface 137a of the first/second speed-shifting yoke 137.

In the above-described state, a clutch (not shown) is released to perform operation to achieve a reverse-shifting position. Although the released clutch isolates the main shaft 10 from the driving power of the engine, the main shaft 10 continues rotating by virtue of inertia.

Figure 11:
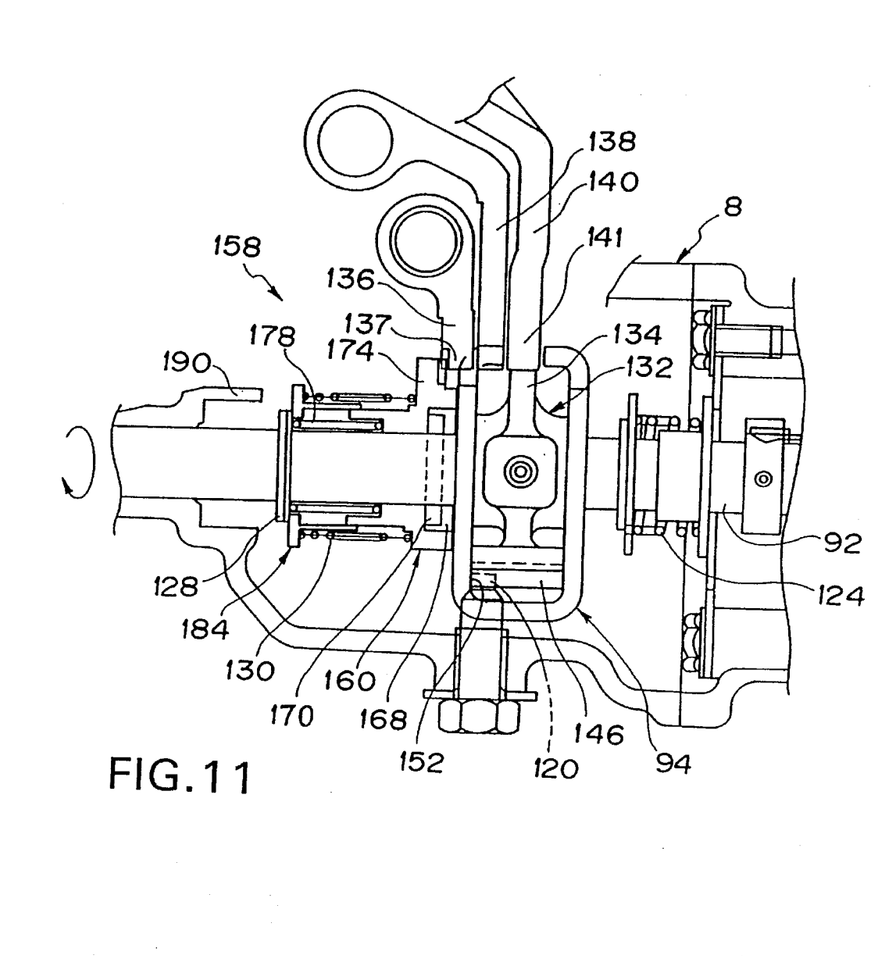
FIG. 11 is a structural view, showing the speed change control section at the beginning of reverse shifting.
Figure 12:
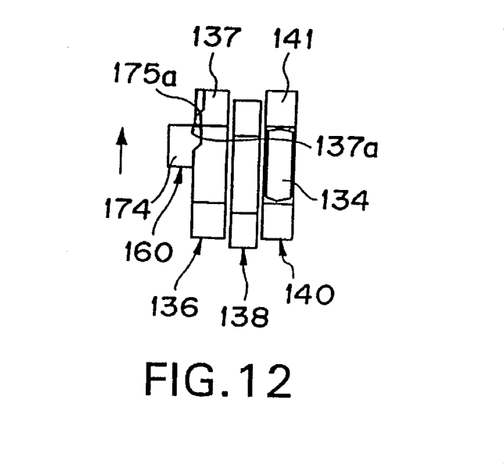
FIG. 12 is a structural view, showing the shifting yokes and the cam member at the beginning of reverse shifting.

As illustrated in FIGS. 11 and 12, the shaft 92 is turned in the direction of an arrow when the operation to change from the reverse-selecting position to the reverse-shifting position is started after the clutch is released.

The rotation of the shaft 92 causes the lever 132 to push a reverse yoke portion 141 of the firth speed/reverse-shifting yoke 140 in a reverse-shifting direction. This movement of the shifting yoke 140 actuates the reverse sleeve 64 via the fifth speed/reverse-shifting shaft (not shown), reverse gear-shifting arm and lever (not shown), and the like, so as to engage the reverse idler gear 62 with the reverse main gear 36.

At this time, the cam member 160 is also rotated in the same direction as the shaft 92 because the guide pin 170, which is fixedly secured to the shaft 92, is held in engagement with groove portions 168. Consequently, the cam member 160, which is attached to the shaft 92 so as to be axially movable, but circumferentially immovable, is rotated together with the shaft 92. The abutment surface 175a of the engaging portion 174 thereby pushes the abutment surface 137a of a second speed yoke portion 137 of the shifting yoke 136 in a second speed-shifting direction. As a result, a second speed-synchronizing mechanism 74 is started to operate.

The shifting yoke 136 thrust in the second speed-shifting direction by the cam member 160 is moved a distance L3, which is the length of a step portion 109 provided in the interlocking plate 94, so as to intercept further movement in the second speed-shifting direction.

As a result, the rotation of the main shaft 10 begins to synchronize with the counter-shaft 12 which remains stopped from rotation. This means that the rotation of the main shaft 10 is decelerated at the beginning of reverse shift process which attempts to engage the reverse idler gear 62 with the reverse main gear 36.

Further continued operation of reverse shifting causes further rotation of the cam member 160 which is biased and urged toward the interlocking plate 94 by the springs 130 and 178. More specifically, the rotation of the shaft 92 forces the engaging portion 174 into further rotation with respect to the shifting yoke 136 which is blocked from movement by the step portion 109 of the interlocking plate 94.

Figure 13:
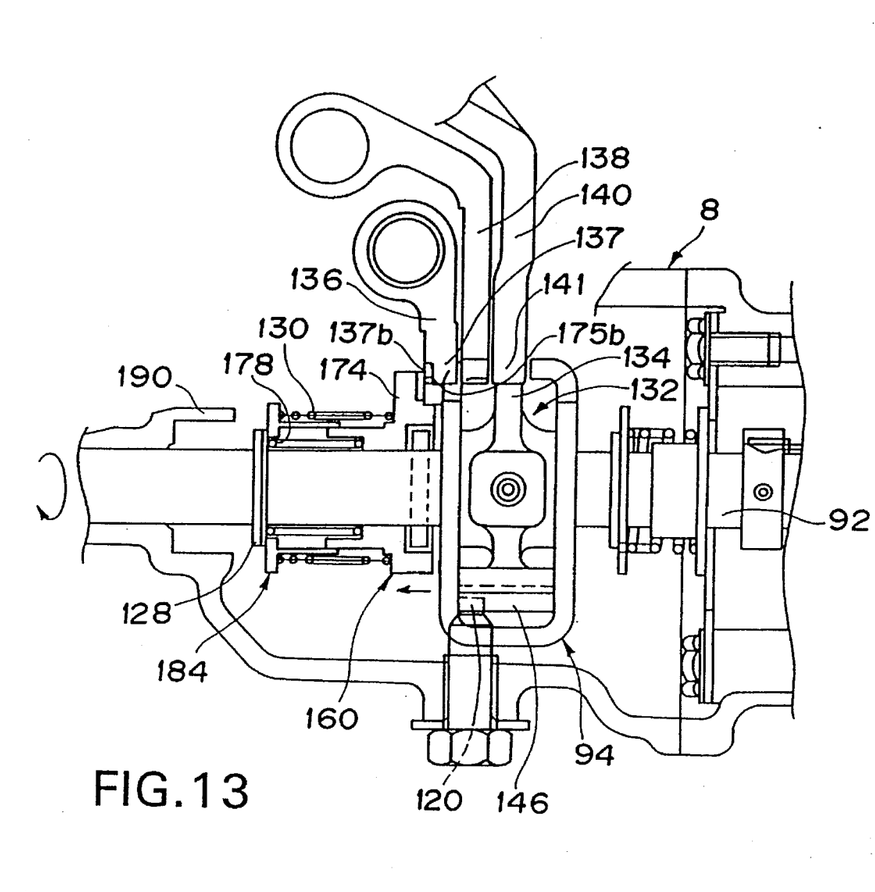
FIG. 13 is a structural view, illustrating the speed change control section in a state of a first/second speed-shifting yoke being disengaged from the cam member at the time of reverse shifting.
Figure 14:
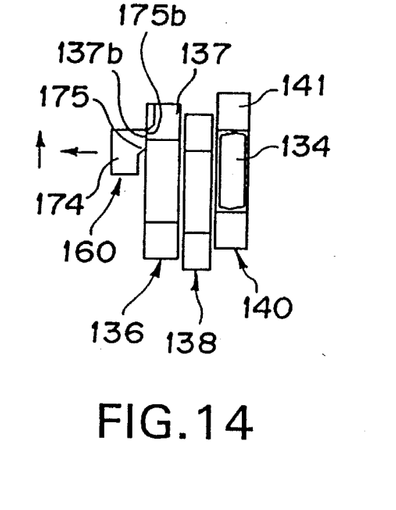
FIG. 14 is a structural view, illustrating the shifting yokes and the cam member in a state of the first/second speed-shifting yoke being disengaged from the cam member at the time of reverse shifting.

Referring now to FIGS. 13 and 14, when a distance of rotation of the cam member 160 rotated by reverse shifting exceeds the length of L3, by which the shifting yoke 136 is movable by the step portion 109, the cam member 160 is moved in a direction of an arrow (a direction spaced apart from the interlocking plate 94) against the resilient force of the springs 130 and 178 as a result of engagement between the slanted abutment surfaces 175a and 137a.

As illustrated in FIGS. 13 and 14, the engaging portion 174 of the cam member 160 is thereby moved to a position at which the side surface 175b of the protruding portion 175 is driven into abutting engagement with a side surface 137b of the second speed yoke portion 137 after the abutment surface 175a is disengaged from the abutment surface 137a.

Still further continued operation of reverse shifting causes the cam member 160 to release the abutment between the side surfaces 175b and 137b. Further, the resilient force of the springs 130 and 178 urges the protruding portion 175 into engagement with the dented portion 139, and a pressing surface 180 of the engaging portion 174 is engaged with a pressed surface 182 of the shifting yoke 136.

The springs 130 and 178 urges the pressing surface 180 to thrust the pressed surface 182. As a result, the shifting yoke 136, which has slightly been moved in the second speed-shifting direction, is shifted to the neutral position.

The shifting yoke 136 is thereby returned to the neutral position, and a second speed-synchronizing mechanism 74 is brought out of operation. At this time, the rotation of the main shaft 10 has already been either sufficiently decelerated or stopped by the action of the synchronizing mechanism 74 shown in FIGS. 11 and 12.

The reverse-shifting operation permits the cam member 160 to still continue rotating with the shaft 92, even after the synchronizing mechanism 74 is disengaged.

Figure 15:
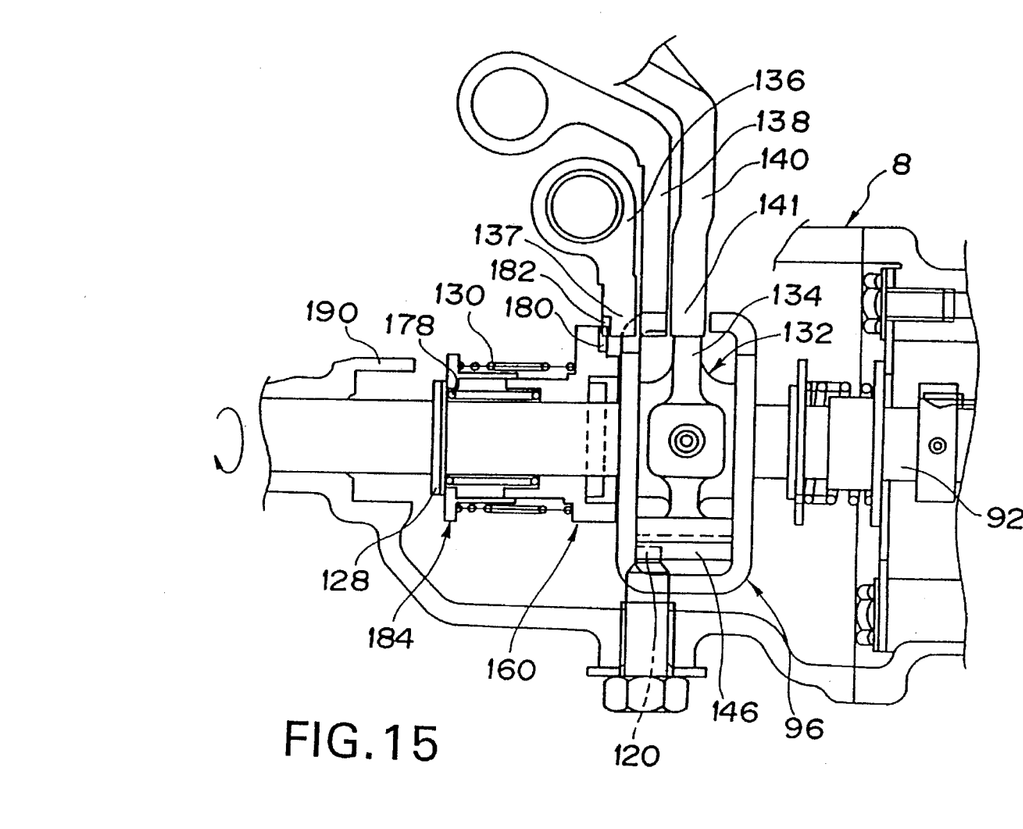
FIG. 15 is a structural view, showing the speed change control section in a state of a protruding portion of the cam member being engaged with a dented portion of the first/second speed-shifting yoke at the time of reverse shifting.
Figure 16:
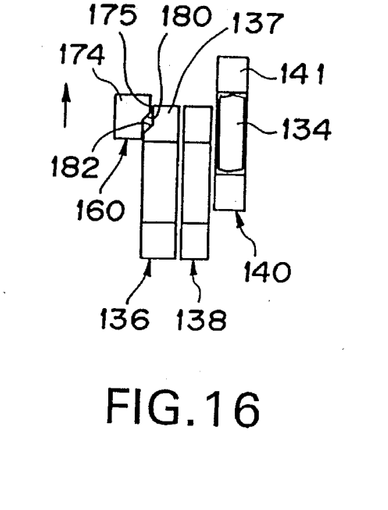
FIG. 16 is a structural view, showing the shifting yokes and the cam member in a state of the protruding portion of the cam member being engaged with the dented portion of the first/second speed-shifting yoke at the time of reverse shifting.

As illustrated in FIGS. 15 and 16, the rotating cam member 160 eventually brings the reverse idler gear 62 into engagement with the reverse main gear 36 as a result of the continued reverse-shifting operation. In addition, the shifting and selecting lever 132 has a limited shifting stroke because the distal end portion 120 of the plate-holding bolt 118 abuts the shifting stroke stopper portion 156 of the stopper member 146.

As a result, an unpleasant gear squeal at the time of engagement of the reverse idler gear 62 with the reverse main gear 36 can be prevented because the rotation of the main shaft 10 has already been either sufficiently decelerated or ceased. In addition, the lever 132 has a limited shifting stroke because the distal end portion 120 of the bolt 118 is in abutment with the shifting stroke stopper portion 156 of the stopper member 146.

Furthermore, since the synchronizing mechanism 74 has already disengaged, the main shaft 10 can freely rotate. This enables the reverse idler gear 62 and the reverse main gear 36 to turn slightly, even when these gear's apex portions are brought into contact with each other. As a result, it is possible to achieve smooth engagement between the gears 62 and 36.

Moreover, when the first/second speed-selecting operation is executed, the restriction portion 190 restrains movement of the guide member 184 in the first/second speed-selecting direction, while allowing movement of the spring support 128. This arrangement avoids compressing the cam spring 178, and thus eliminates an increase in operating force.

In this way, the reverse gear squeal-preventing device 158 includes the cam member 160 which is fitted to the shifting and selecting shaft 92 so as to be axially movable and circumferentially immovable. The cam member 160 forces the first/second speed-shifting yoke 136 into slight movement in the second speed-shifting direction at the beginning of the reverse-shifting time. As a result, the device 158 is capable of preventing a squeal of the reverse gears because the cam member 160 allows the second speed-synchronizing mechanism 74 to be brought into slight action at the beginning of the reverse-shifting time, with the result that the synchronous action of the synchronizing mechanism 74 ceases rotation of the main shaft 10.

The device 158 is further provided with: the guide member 184 attached to the cam member 160 so as to be axially movable; the cam spring 178 biased at one end against the cam member 160 and at the other end against the spring support 128 that is fixedly mounted on the shaft 92; the first/second speed-selecting spring 130 biased at one end against the cam member 160 and the other end against the spring support 128 via the guide member 184; and, the restriction portion 190 positioned in the transmission case 8 for limiting movement of the guide member 160 in the first/second speed-selecting direction so as to compress the selecting spring 130 at the time of first/second speed selecting. This structure can alleviate stresses which are exerted on the first/second speed-selecting spring at the time of reverse selecting, and avoids exercising the stresses on the cam spring 178 at the time of first/second speed selecting.

As a result, the device 158 is capable of preventing a reverse gear squeal without increasing operating forces for both first/second speed selecting and reverse selecting. In addition, the device 158 can be assembled with fewer components and at lower cost when compared with conventional devices. Furthermore, the device 158 can be adapted for use in differently structured transmissions.

Moreover, the device 158 has the first/second speed-shifting yoke 136 and the cam member 160 provided with the pressed surface 182 and the pressing surface 180, respectively. The cam spring 178 urges the pressing surface 180 to push the pressed surface 182 at an intermediate period of reverse-shifting time, whereby the shifting yoke 136, which has slightly been moved in the second speed-shifting direction, is moved to the neutral position. This arrangement ensures that the shifting yoke 136, which is in a state of being slightly shifted in the second speed-shifting direction during reverse gear squeal-preventing operation, can be returned to the neutral position.

Yet further, the device 158 has the interlocking plate 94 provided with the selecting stroke stopper portion 150 at the inner surfaces 106 and 108, against which the distal end portion 120 of the plate-holding bolt 118 is driven at the selecting time, thereby restricting a selecting stroke. As a result, it is possible to provide a change in an inherent vibrational frequency, a reduction in an impinging noise of the bolt 118 at the selecting time, and a decrease in width of the interlocking plate 94 for a down-sizing purpose.

As can be seen from the above, the reverse gear squeal-preventing device according to the present invention allows a cam member to bring a forward stage-synchronizing mechanism into small action at the beginning of reverse-shifting time in order to cease rotation of a main shaft under the synchronous action of the synchronizing mechanism, whereby reverse gears can be prevented from squealing. In addition, the device can mitigate stresses which are exerted on a forward stage-selecting spring at the time of reverse selecting, and obviates the stresses which would otherwise be imposed on a cam spring at the time of forward stage selecting.

As a result, the device is capable of preventing a reverse gear squeal without increasing operating forces for both forward stage selecting and reverse selecting. In addition, the device can be realized with fewer components and at lower cost when compared with conventional devices. Furthermore, the device can be adapted for use in differently structured transmissions.

Moreover, the device is arranged to permit the cam spring to push a pressing surface of the cam member, at an intermediate period of reverse-shifting time, onto a pressed surface which is provided on a forward stage-shifting yoke. This arrangement ensures that the forward stage-shifting yoke, which has slightly been moved in a forward stage-shifting direction during reverse gear squeal-preventing operation, can be returned to the neutral position. Yet further, the device provides inner surfaces of an interlocking plate as selecting stroke stopper portions, against which a distal end portion of a plate-holding bolt is driven during selecting operation. As a result, it is possible to provide a change in an intrinsic vibrational frequency, a reduction in an impinging noise of the bolt at the selecting time, and downsizing of the interlocking plate.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A reverse gear squeal-preventing device including a shifting and selecting shaft adapted to provide both axial movement at selecting time and circumferential movement at shifting time, said shifting and selecting shaft being provided with an interlocking plate as a prevention against malfunction, whereby a forward stage-synchronizing mechanism is actuated at the time of reverse shifting so as to prevent a gear squeal, the improvement comprising: a cam member attached to said shifting and selecting shaft so as to be axially movable and circumferential immovable for driving a forward stage-shifting yoke into slight movement in a forward stage-shifting direction at the beginning of reverse-shifting time; a guide member attached to said cam member so as to be axially movable; a cam spring biased at one end against said cam member and at the other end against a support that is fixedly positioned on said shifting and selecting shaft; a forward stage-selecting spring biased at one end against said cam member and the other end against said support via said guide member; and, a restriction element located in a transmission case for restricting movement of said guide member in a forward stage-selecting direction so as to compress said selecting spring at the time of forward stage selecting.

2. The reverse gear squeal-preventing device according to claim 1, wherein said cam member comprises an engaging portion which is advanced by said cam spring into engagement with said forward stage-shifting yoke at the time of reverse shifting, and which is released from the engagement with said forward stage-shifting yoke against the force of said cam spring after said forward stage-shifting yoke is brought into slight movement in said forward stage-shifting direction at the beginning of reverse shifting.

3. The reverse gear squeal-preventing device according to claim 1, wherein said forward stage-shifting yoke comprises a pressed surface, and said cam member comprises a pressing surface for pushing said pressed surface with the aid of said cam spring at an intermediate period of reverse-shifting time, whereby said forward stage-shifting yoke, which has slightly been shifted toward said forward stage-shifting direction, is moved to a neutral position.

4. The reverse gear squeal-preventing device according to claim 1, wherein said interlocking plate comprises a selecting stroke stopper portion at an inner surface of said interlocking plate, against which a distal end portion of a plate-holding bolt is driven at selecting time, thereby restricting a selecting stroke.

5. The reverse gear squeal-preventing device according to claim 2, wherein said forward stage-shifting yoke comprises a pressed surface, and said cam member comprises a pressing surface for pushing said pressed surface with the aid of said cam spring at an intermediate period of reverse-shifting time, whereby said forward stage-shifting yoke, which has slightly been shifted toward said forward stage-shifting direction, is moved to a neutral position.

* * * * *